United States Patent Office 2,872,041
Patented Feb. 3, 1959

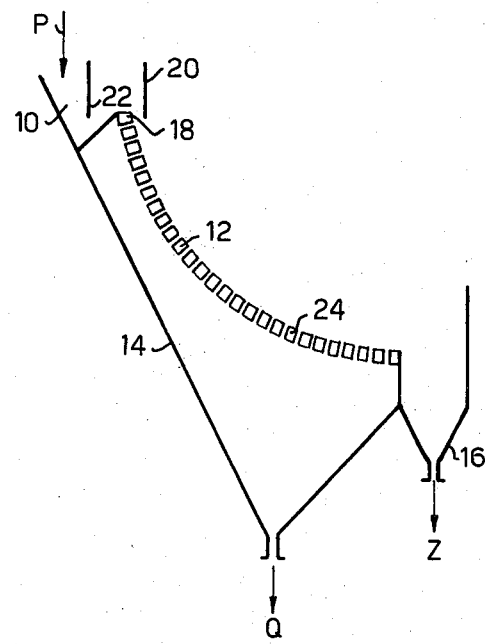

2,872,041
SCREEN

Freerk J. Fontein, Heerlen, and Hubert H. Dreissen, Geleen, Netherlands, assignors to Stamicarbon N. V., Heerlen, Netherlands Application December 14, 1954, Serial No. 475,156

Claims priority, application Netherlands June 22, 1954

2 Claims. (Cl. 209—273)

This invention relates to particle separation and more particularly to an improved apparatus for screening liquid suspended mixtures of particles.

More specifically, the invention contemplates an improved feeding means for supplying a suspended mixture in a substantially tangential direction to the concave side of a cylindrically curved screen deck of the type described in copending application Serial No. 475,251, filed concurrently herewith by Freerk Fontein. In accordance with the present invention, the suspended mixture is fed by gravity to the screening deck at a relatively low rate so that the velocity of the particles passing therealong is not lower than 50 cm. per second.

Accordingly, it is an object of the present invention to provide an improved apparatus for separating mixtures of particles differing in size wherein the mixture is supplied to a fixed, cylindrically curved screening deck in a substantially tangential direction along its concave side at a rate requiring a minimum expenditure of energy without a critical sacrifice of capacity or separation sharpness.

Another object of the present invention is the provision of a wet screening apparatus having improved means for feeding a mixture of solid particles to the concave side of a cylindrically curved screening deck in a substantially tangential direction which requires less expenditure of energy than the feeding means heretofore utilized, but yet maintains a relatively high capacity and separation sharpness.

These and other objects of the present invention will become more apparent during the course of the following detailed description and appended claims.

The invention may best be understood with reference to the accompanying drawing wherein a schematic view of an apparatus embodying the principles of the present invention is shown in side elevation.

As shown, the apparatus includes, in general, an overflow reservoir feeding means 10 which is adapted to receive a supply of liquid suspended solid particles P and to feed the suspended mixture in a substantially tangential direction to the concave side of a cylindrically curved screening deck 12. Arranged on the convex side of the screen deck is a funnel 14 for collecting and discharging at Q an undersized fraction of the particles which have preceded through the screening deck 12. Disposed on the discharge end of the screening deck is a funnel 16 for collecting and discharging at Z the overflow fraction of particles which have travelled along the screening deck in a direction substantially perpendicular to the generatrix thereof from the feed end to the discharge end.

The overflow reservoir feeding means 10, to which the present invention is particularly directed, is preferably arranged so as to retain a supply of the suspended mixture and permit the same to freely flow over the feed end of the screening deck as an overflow edge as designated at 18. Disposed substantially parallel with the tangential plane of the feed end of the screening deck and extending across the entire width thereof, is a plate 20 for regulating the flow of suspended mixture issuing from the reservoir 10. As shown, the plate 20 is spaced slightly on the concave side of the screening deck 12 so that its lower end portion forms with the overflow edge 18 of the screening deck a narrow slit parallel with the generatrix of the cylindrical screening deck surface. In order to promote the equal distribution of the suspended mixture across the entire width of the screening deck, a second plate 22, generally parallel with the plate 20, may be disposed within the reservoir 10. The plate 22 also extends across the entire width of the screening deck and may, if desired, be connected with the plate 20 by a third plate (not shown) extending between the upper edges of the two plates 20 and 22.

The screening deck 12 preferably comprises a plurality of spaced bars 24 extending in a plane perpendicular to the plane of the drawing. Each of the bars 24 may be rectangular in profile and spaced apart a distance less than their width so as to form slits therebetween of substantial rectangular profile. Of course, the bars may be trapezoidal in cross section if desired.

It will be seen that as the suspended mixture is fed by the feed means 10 in a substantially tangential direction along the concave side of the screening deck 12, the particles will travel across the concave surface of the deck in a direction substantially perpendicular to the generatrix thereof. Each of the bars scrapes off a thin layer from the moving mass of the mixture as it passes along the screening deck. The thickness of this scraped-off layer has been found to normally equal one-fourth of the width of the slit between the bars. A solid particle which is less than half emersed in the thick layer will thus be entrained and pass through the slit. Consequently, the biggest particle that can get into a slit has a diameter of twice the thickness of the scraped-off layer or one-half the width of a slit.

The screening deck is preferably arranged so that it may be reversed end for end so that the original feed end becomes the discharge end and the original discharge end becomes the feed end. Since the greatest wear is on the leading edge of the bars, a more uniform wear can be obtained by reversing the deck. In this manner, the efficient useful life of the screening deck is greatly enhanced. A fine or undersized fraction which has passed through the slits is collected in the funnel 14 and discharged therefrom, while the course or overflow fraction issuing tangentially from the discharge end is collected in the funnel 16 and discharged therefrom.

A significant feature of the present invention is that a relatively sharp separation and high capacity can be obtained with a feed rate substantially lower than heretofore utilized. Thus, the energy expended in feeding the mixture to the apparatus will be considerably lower with attendant advantages. Satisfactory results have been obtained with the present invention wherein the suspended mixture is allowed to freely fall from the overflow reservoir a distance approximately 2 cm. This corresponds to a feed rate wherein the velocity of particles moving past the screening deck is approximately 50 cm. per second.

Following the procedure outlined above, an apparatus such as shown in the drawing was provided with a screening deck having the shape of one-fourth of a circular cylinder. The radius and width of the screening deck were 400 mm. and 250 mm., respectively. The bars were trapezoidal in shape with rounded-off angles. The largest width of the bars was 2.5 mm. with the width of the slits between the bars being 1 mm. The distance between the plate 20 and the feed end of the screening deck or overflow edge 18 was 15 mm. The feed amounted to 23.2 cubic meters per hour and consisted of water with 145 g. of sand and fine gravel per litre.

The undersized fraction amounted to 20.6 cubic meters per hour and the oversized fraction to 2.6 cubic meters per hour. The diameter of the 50% grain was 0.45 mm. and the diameter of the 95% grain was 0.80 mm. The terms 50% and 95% grain denote the size of the grains of which 50% and 95% respectfully are carried off with the oversized product.

When the plate 20 was omitted, the screen capacity dropped owing to clogging, while the particle size of separation increased and the screening became less accurate.

It is to be understood that the terminology employed herein is for purposes of description and not limitation. The term "cylindrical" is herein used in its mathematical sense. It is also to be understood that the form of the invention herewith shown and described is to be taken as the preferred embodiment of the same, and that various changes may be made without departing from the spirit of the invention or the scope of the appended claims.

We claim:

1. Apparatus for separating liquid suspended particles according to size comprising a plurality of stationarily mounted elongated rigid elements defining a screening deck having a feed end, a discharge end and a separating surface generally conforming to a surface generated by moving a line parallel to itself so that a given point on the line moves in a plane perpendicular to the moving line; each of said elements having a planar surface extending longitudinally of the element and disposed in a plane transverse to the plane of the surface of said body, said planar surface of each element facing the feed end of said body; said elements being mounted in spaced parallel relation with respect to each other and extending in a direction parallel with the generating line of said separating surface so as to define a plurality of apertures elongated in the direction of extent of said generating line, means for feeding the particles and the suspending liquid in layer formation onto the feed end of said screening deck in the direction of extent thereof and substantially perpendicular to the generating line of the said separating surface with an initial velocity of at least 50 cm./sec., said feeding means comprising an overflow reservoir disposed adjacent said feed end for receiving a supply of said suspended mixture, said reservoir being related to said screening deck feed end such that said mixture is free to flow outwardly from said reservoir over said feed end as an overflow edge, said feeding means also including a plate disposed directly in front of said screening deck feed end and substantially parallel with the plane of said feed end and extending across the entire width of the screening deck on the separating surface side thereof so as to form a narrow slit at the feed end of said screening deck parallel with said generating line.

2. Apparatus as defined in claim 1 wherein said reservoir includes a second plate spaced from said first-mentioned plate and arranged to equally distribute said suspended mixture across the screening deck as it flows over said overflow edge.

References Cited in the file of this patent

UNITED STATES PATENTS

| 369,836 | Blackman | Sept. 13, 1887 |
| 1,135,304 | Liggett et al. | Apr. 13, 1915 |
| 1,700,925 | Dezurik | Feb. 5, 1929 |

FOREIGN PATENTS

| 651,534 | Germany | Oct. 14, 1937 |